US006248998B1

(12) United States Patent
Okumoto et al.

(10) Patent No.: US 6,248,998 B1
(45) Date of Patent: *Jun. 19, 2001

(54) PLASMA ION SOURCE MASS SPECTROMETER

(75) Inventors: Toyoharu Okumoto, Hitachinaka; Masamichi Tsukada, Higashiibaraki-gun; Akira Owada, Hitachinaka, all of (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,381

(22) Filed: Feb. 9, 1998

(30) Foreign Application Priority Data

Feb. 24, 1997 (JP) .................... 9-039005

(51) Int. Cl.[7] .................... B01D 59/44; H01J 49/00

(52) U.S. Cl. .................... 250/288; 250/423 R

(58) Field of Search .................... 250/281, 288, 250/423 R

(56) References Cited

U.S. PATENT DOCUMENTS 4,127,760 * 11/1978 Meyer et al. .................... 219/121 P
4,559,096 * 12/1985 Friedman et al. .................... 156/272.2
4,625,094 * 11/1986 Marhic et al. .................... 219/121 PM
4,755,344 * 7/1988 Friedman et al. .................... 376/108
4,906,582 * 3/1990 Fukui et al. .................... 436/153
4,955,717 * 9/1990 Henderson .................... 356/316
5,063,329 * 11/1991 Okamoto .................... 315/111.21
5,068,534 * 11/1991 Bradshaw et al. .................... 250/288
5,597,495 * 1/1997 Keil et al. .................... 216/66

OTHER PUBLICATIONS

D.E. Jensen and W.J. Miller; Electron Attachment and Compound Formation in Flames. III. Negative Ion and Compound Formation in Flames Containing Tungsten and Potassium; Oct. 15, 1970; pp. 3287–3292; The Journal of Chemical Physics.

Robert S. Houk, Velmer A. Fassel, Gerald D. Flesch, Henry J. Svec, Alan L. Gray and Charles E. Taylor; Inductively Coupled Argon Plasma as a Ion Source for Mass Spectrometric Determination of Trace Elements; Dec. 1980; Excerpt from Analytical Chemistry; pp. 2283–2289.

* cited by examiner

*Primary Examiner*—Bruce C. Anderson
(74) *Attorney, Agent, or Firm*—Kenyon & Kenyon

(57) ABSTRACT

A plasma ion source mass spectrometer comprising a plasma ion source 40 for ionizing a sample with a plasma; a mass filter 60 for subjecting the sample ionized by the plasma ion source 40 to mass spectrometry; and an interface unit 50 having an orifice formed in a cone 52, 54 for introducing the sample ionized by the plasma ion source 40 into the mass filter 60. Further the plasma ion source mass spectrometer comprises a first cooler 49 for cooling a plasma generator 41 of the plasma ion source 40 and a plasma generating power source 44; and a second cooler 56 independent of the first cooler 49, for cooling the interface unit 50 and for raising the temperature by changing the cooling efficiency so as to reduce the influence of deposition on the interface unit 50. With this construction, the temperature of the interface unit can be controlled without changing the analysis sensitivity of the plasma ion source mass spectrometer.

2 Claims, 3 Drawing Sheets

PLASMA ION SOURCE MASS SPECTROMETER

FIELD OF THE INVENTION

The present invention relates to a plasma ion source mass spectrometer and a method therefor and, more particularly, to a plasma ion source mass spectrometer for detecting trace elements with a mass filter by ionizing a sample with a plasma ion source, and a method therefor.

BACKGROUND OF THE INVENTION

A plasma ion source mass spectrometer of the prior art is described in Items 22 to 25 of Measurement Series 28 "Plasma Ion Source Mass Spectrometry", the Spectroscopical Society of Japan, edited by Koji Kawaguchi and Taketoshi Nakahara. In this description, object elements contained in a sample solution are ionized by a plasma, and the resultant ions are extracted through an interface unit into a vacuum so that they may be measured by a mass filter. For extracting the ions produced by the plasma into the mass filter, the interface unit generally uses a conical sampling cone and skimmer cone. This interface unit, especially the sampling cone is required to endure the high temperature of the plasma because it is exposed directly to the plasma whose temperature reaches as high as 5,000 to 6,000° C. For this requirement, the sampling cone is usually made of a material having an excellent thermal conductivity and is sufficiently cooled with cooling water so that it may not melt down.

However, the interface unit is given a role to introduce the object elements contained in the solution sample and ionized by the plasma into the vacuum in the same state as in the plasma. If a portion is cooled with the cooling water to a lower temperature, a molecular ion peak may be formed by the cooling, or the interface unit surface may be coated with insulator and charged up by the molecular ion peak formed. This causes a problem of a drop of sensitivity.

As disclosed in Japanese Patent Laid-Open No. 161335/1995, therefore, the temperature of an orifice formed in the sampling cone of the interface unit is detected by means of an optical temperature sensor, and the high-frequency electric power to be supplied to the cavity for generating the plasma is adjusted so that the temperature of the orifice may not allow recombination of ions.

However, this method of adjusting the high-frequency electric power to be supplied to the cavity changes the condition of the plasma generation, so that the ionizing condition is changed to bring up a problem of the change in the analysis sensitivity.

SUMMARY OF THE INVENTION

An object of the invention is to provide a plasma ion source mass spectrometer capable of controlling the temperature of an interface unit without changing the analysis sensitivity, and a method for the mass spectrometer.

In order to achieve this object, the invention adopts the following constructions.

(1) In order to achieve this object, according to the invention, there is provided a plasma ion source mass spectrometer comprising a plasma ion source for ionizing a sample with a plasma; a mass filter for filtering the mass of the sample ionized by the plasma ion source; and an interface unit having an orifice formed in a cone for introducing the sample ionized by the plasma ion source into the mass filter, wherein the plasma ion source mass spectrometer further comprises first cooling means for cooling a plasma generator of the plasma ion source and a plasma generating power source; and second cooling means independent of the first cooling means for cooling the interface unit by feeding it with a coolant and for raising the temperature of the interface unit by changing the cooling efficiency so as to reduce the influence of the deposition adhering to the interface unit.

(2) In the construction (1), preferably, the second cooling means changes the set temperature of the cooling water acting as the coolant. Thanks to this construction, any further deposition of insulator is prevented by controlling the interface unit to a higher temperature, so that in the plasma ion source mass spectrometer and its method the signal intensity does not lower and stable measurement can be made.

(3) In the construction (1), preferably, the second cooling means changes the flow rate of the coolant. Thanks to this construction, the deposition of insulator is prevented by controlling the interface unit to a higher temperature, so that in the plasma ion source mass spectrometer and its method the signal intensity does not lower and stable measurement can be made.

(4) There is provided a plasma ion source mass spectrometry for analyzing the mass spectrum of a sample ionized by a plasma ion source, by introducing the ionized sample into a mass filter through an interface unit, wherein by using second cooling means independent of first cooling means for cooling a plasma generator of the plasma ion source and a plasma generating power source, the temperature of the interface unit is controlled to not higher than a value at which materials forming the interface unit melt, and to not lower than a value at which the change with time of the signal intensity detected by the mass filter lowers. Thanks to this method and construction, the plasma ion source mass spectrometer and its method can control the temperature of the interface unit without changing the analysis sensitivity, so that the signal intensity does not lower and stable measurement can be performed.

DETAILED DESCRIPTION OF THE PREFERRED EMBODIMENTS

Figure 1:
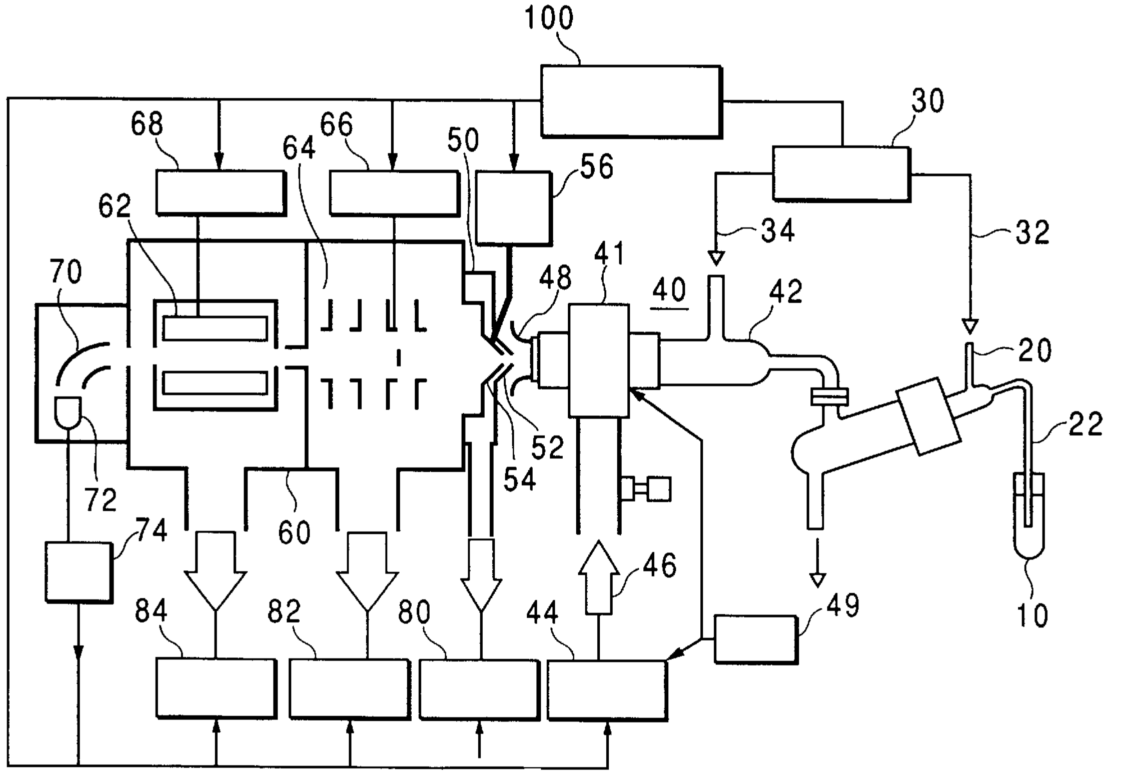
FIG. 1 is a diagram showing the entire construction of a microwave induced plasma trace element filtering apparatus of one embodiment according to the invention.

With reference to FIGS. 1 and 2, a plasma ion source mass spectrometer of one embodiment according to the invention will be described, taking the case of a microwave induced plasma trace element filtering apparatus.

First of all, the entire construction of a microwave induced plasma trace element filtering apparatus of one embodiment according to the invention will be described with reference to FIG. 1.

FIG. 1 is a diagram showing the entire construction of the microwave induced plasma trace element filtering apparatus of the embodiment according to the invention.

An object sample 10 to be measured is fed through a capillary tube 22 to an atomizer 20 such as a nebulizer. The sample 10 is ordinarily a liquid such as an aqueous solution, or an organic solvent such as alcohol. The atomizer 20 is supplied with a carrier gas 32 from a gas controller 30, so that it atomizes the sample 10 introduced. The gas controller 30 controls the atomizer 20 to atomize the sample under a suitable condition. The gas controller 30 is controlled by a control computer 100.

The sample, atomized by the atomizer 20 is introduced into a quartz torch tube 42 constituting a plasma ion source 40. Into this quartz torch tube 42, there is introduced a plasma gas 34 from the gas controller 30. A plasma generator 41 is attached to the end of the quartz torch tube 42.

The plasma generator 41 is fed with microwaves 46 of 2.45 GHz from a microwave power source 44. The plasma generator 41 generates a plasma 48 in the atmosphere with the microwaves 46 from the plasma gas 34 fed. The plasma 48 has a temperature reaching as high as about 5,000 to 6000° C.

The sample 10 atomized by the carrier gas 32 and introduced into the plasma 48 by the plasma gas 34 is dissociated, atomized and ionized and released to the atmosphere. The microwave power source 44 is controlled to the optimum condition by the control computer 100. The microwave power source 44 and the plasma generator 41 are cooled by a first cooler 49 because they generate a lot of heat. Here, the temperature of the cooling water is controlled to 20° C. when the flow rate of the cooling water is 2.4 l/min.

The sample thus ionized in the atmosphere by the plasma 48 is introduced to a mass filtering unit 60 and subjected to mass spectroscopy. Since a mass filter 62 is operated in a vacuum, however, an interface unit 50 is provided so as to extract the ionized sample efficiently into the vacuum. The interface unit 50 comprises a sampling cone 52 and a skimmer cone 54. These sampling cone 52 and skimmer cone 54 are made of an excellent cooling metal such as copper or nickel.

By using the interface unit 20, the sample ionized in the plasma 48 is extracted into the mass filtering unit 60.

Here in the present embodiment, the interface unit 50 is cooled by a second cooler 56. This second cooler 56 is a cooling mechanism independent of the first cooler 49 and is controlled by the control computer 100 so that the interface unit 50 may be at a predetermined temperature.

The cooling water fed from the second cooler 56 to the interface unit 50 can be changed in its temperature or flow rate so that the temperature of the interface unit 50 can be controlled to the predetermined value by changing the temperature or flow rate of the cooling water, i.e., by changing the cooling efficiency. The temperature of the interface unit at this time is controlled to a high level at which the interface unit 50 does not melt but the adverse influence of the deposition adhering to the interface unit is mitigated.

The temperature of the interface unit 50 can be freely controlled by arbitrarily changing the temperature or flow rate of the cooling water cooling the interface unit 20. By controlling the temperature of the interface unit 50 accurately, moreover, it is possible to accurately control the temperature (kinetic energy) of the ions passing through the interface unit 50 which greatly influences the number of ions obtained as an actually measured value and the degree of generation of the molecular ion peak produced as the background.

The detail of the cooling control of the interface unit 50 by the second cooler 56 will be described hereinafter with reference to FIG. 2.

The ionized sample thus extracted through the interface unit 50 into the vacuum space is focused and directed into the quadrupole mass filter 62 by an ion lens 64 which is controlled by the control computer 100. The ion lens 64 is supplied with a voltage by an ion lens power source 66 so that it can control the behavior of the ion stream having electric properties.

The ions thus introduced into the quadrupole mass filter 62 are classified into elements by the mass filter 62. A mass filter driving power source 68 is controlled by the control computer 100 so that the quadrupole mass filter 62 can extract an arbitrary element.

In ordinary measurement, the individual elements classified from the sample by the quadrupole mass filter 62 are deflected at 90 degrees by a deflection electrode 70, directed to and detected by an ion detector 72. This signal is amplified by an amplifier 74 to obtain data by using the method called the "pulse counting method", for detecting incident ions one by one.

A very high sensitive measurement can be performed by the method thus far described.

The mass filter 62 is subjected to three stages of evacuation, i.e., differential pumping by using vacuum pumps 80, 82 and 84 since the mass filter 62 is operated in a high vacuum of about $10^{-6}$ Torrs. The vacuum pump 80 is generally a rotary pump, and the vacuum pumps 82 and 84 are a combination of a turbo molecular pump and a rotary pump or a combination of an oil diffusion pump and a rotary pump. The vacuum pumps 80, 82 and 84 are controlled by the control computer 100 so that the evacuation is automatically performed.

Here will be described the cooling control of the interface unit of the embodiment with reference to FIG. 2.

FIG. 2 is an explanatory diagram of the cooling control of the interface unit of the plasma ion source mass spectrometer of one embodiment according to the invention.

Figure 2A:
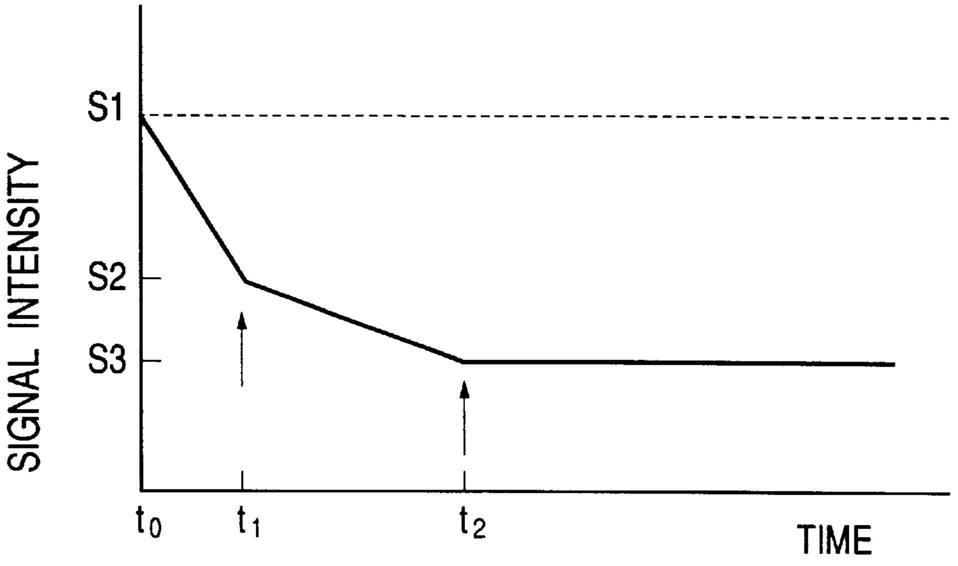
FIG. 2A–B is an explanatory diagram of the cooling control of an interface unit of a plasma ion source mass spectrometer of the embodiment of the invention.
Figure 2B:
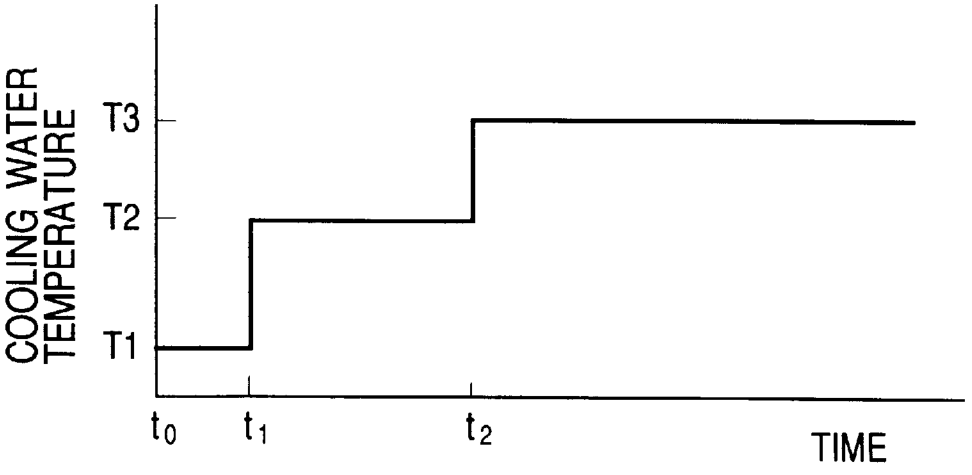

FIG. 2(A) illustrates a change in the intensity of a signal which is detected by the ion detector 72, amplified by the amplifier 74 and taken in by the control computer 100, FIG. 2(B) illustrates a change in the cooling water temperature when the interface unit 50 is cooled by the second cooler 56.

Here will be described the case in which a trace metal in the sea water, a sample, is measured.

Assume that the cooling water temperature is set at T1 at a measurement starting time t0, as illustrated in FIG. 2(B). The water temperature T1 is, for example, 20° C. The flow rate of the cooling water is constant, e.g., the value is 2.4 1/min. The intensity of the signal detected is assumed to be S1 at the time t0.

When the cooling water temperature is kept at T1, the signal intensity gradually lowers from S1 with time. This is because sodium chloride (NaCl) contained in the sea water is cooled by the cooled interface unit 50, and it adheres as insulator to the surface of the interface unit 50, thereby causing the charge-up phenomenon in which the ions are obstructed to pass and the sensitivity lowers. As a result, the signal intensity decreases, as illustrated in FIG. 2(A).

In order to prevent this, at time t1, the temperature of the cooling water for cooling the interface unit 50 by means of the second cooler 56 is controlled to T2. The water temperature T2 is, e.g., 60° C.

The signal intensity detected gradually lowers from S2 at and after time t1, but the lowering rate is gentler than that during the time period from time t0 to time t1. This is because the temperature of the surface of the interface unit 50 rises, reducing the further deposition of insulator on the surface.

The time period from t1 to t2 is about one hour, and stable measurement is still difficult if the signal intensity changes in such a time period.

At time t2, therefore, the temperature of the cooling water for cooling the interface unit 50 by means of the second cooler 56 is controlled to T3.

The water temperature T3 is 90° C., for example. The signal intensity detected then remains constant even if the time elapses. This is because the temperature of the surface of the interface unit 50 rises so high that deposition of insulator on the surface does not occur any longer.

At this time, the temperature of the surface of the interface unit 50 is nearly the boiling point of the insulator. For example, the insulator of the case in which trace metals in the sea water are to be measured is sodium chloride having a boiling point of 1,413° C. Thanks to the heating up to this temperature, further deposition of insulator can be prevented to eliminate the reduction in the signal intensity, thereby effecting stable measurement.

At this time, moreover, copper or nickel used in the interface unit has a melting point of not lower than 1,500° C., causing no problem such as the melting of the interface unit.

By thus raising the cooling water temperature, the signals obtained can be stabilized at constant level with the elapse of time of the horizontal axis, namely, over a long time period, for example, four to five hours, or over ten hours, as the case may be.

As in the measurement of trace metals in the sea water, when the kind of the obstructive insulator is known, a high signal intensity S1 can be stably obtained from the beginning of the measurement, as shown by the dotted line of FIG. 2(A), by setting in advance the cooling water temperature at the time of cooling the interface unit 50 by means of the second cooler 56 at a value according to the kind of the insulator, and hence stable measurement is possible.

At the end of the measurement, the interface unit is cleaned up to remove the insulator, so that a high signal intensity can be obtained at the beginning of the measurement.

During the control of the temperature of the interface unit, moreover, the condition under which a plasma is produced is not changed, so that the temperature can be controlled without changing the analysis sensitivity.

By controlling the cooling water temperature with the second cooler capable of controlling the temperature of the interface unit independently, as has been described hereinbefore, further deposition of the insulator can be prevented by controlling the temperature of the interface unit to a higher value, allowing the stable measurement without any drop in the signal intensity.

During the control of the temperature of the interface unit, moreover, the condition under which a plasma is produced is not changed, so that the temperature can be controlled without changing the analysis sensitivity.

With reference to FIG. 3, here will be described the cooling control of the interface unit of another embodiment of the invention.

FIG. 3 is an explanatory diagram of the cooling control of the interface unit of a plasma ion source mass spectrometer of another embodiment according to the invention.

Figure 3A:
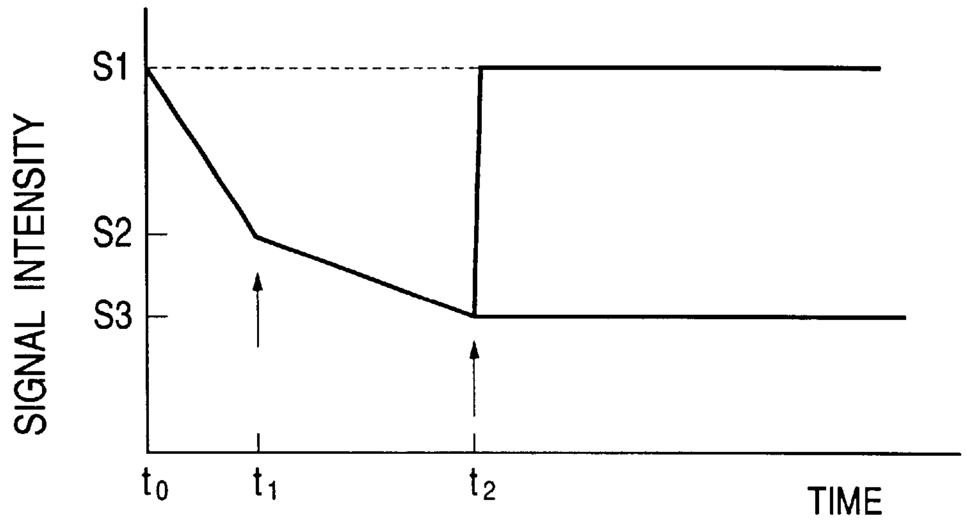
FIG. 3A–B is an explanatory diagram of the cooling control of an interface unit of a plasma ion source mass spectrometer of another embodiment of the invention.
Figure 3B:
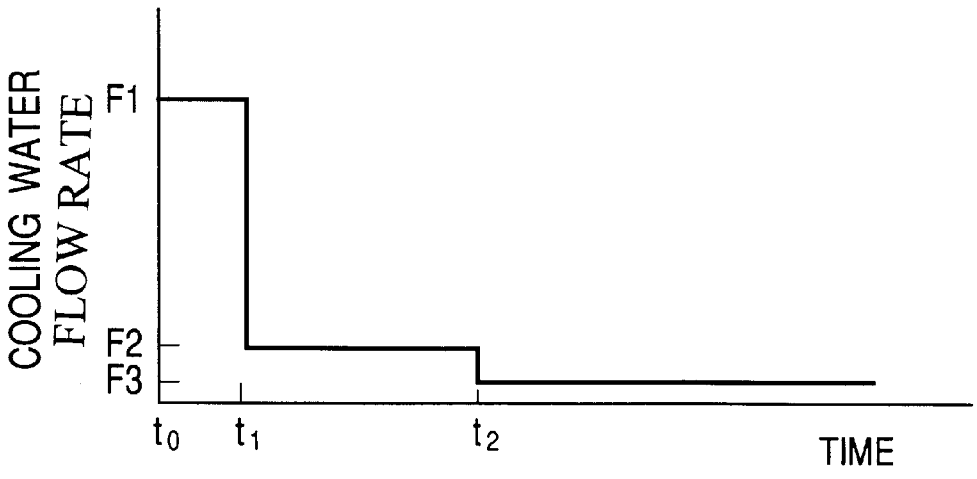

FIG. 3(A) illustrates a change in the intensity of the signal detected by the ion detector 72, amplified by the amplifier 74 and taken in by the control computer 100, and FIG. 3(B) illustrates a change in the cooling water flow rate when the interface unit 50 is cooled by the second cooler 56. Here, the entire construction of the microwave induced plasma trace element filtering apparatus is the same as that shown in FIG. 1.

Here will be described the case in which trace metals in the sea water are measured.

Assume that the cooling water flow rate is set at Fl at the measurement starting time t0, as illustrated in FIG. 2(B). Here, the flow rate F1 is, e.g., 2.4 l/min. Moreover, the cooling water temperature is set at a constant level of 20° C., for example.

The signal intensity detected is S1 at the time t0. If the cooling water flow rate F1 is kept constant, the signal intensity gradually lowers from S1 with time. This is because sodium chloride (NaCl) contained in the sea water is cooled by the cooled interface unit 50, so that it adheres as insulator to the surface of the interface unit 50, thereby causing the charge-up phenomenon in which the ions are obstructed and the sensitivity lowers. As a result, reduction in the signal intensity is caused, as illustrated in FIG. 2(A).

At time t1, therefore, the flow rate of cooling water for cooling the interface unit 50 by the second cooler 56 is controlled down to F2. This flow rate F2 is, e.g., 0.4 l/min.

The signal intensity detected gradually lowers from S2 at and after time t1, but the lowering rate is gentler than that during the time period from time t0 to time t1. This is because the temperature of the surface of the interface unit 50 rises and consequently further deposition of insulator on the surface is reduced.

The time period from t1 to t2 is about one hour, and the stable measurement is still difficult if the signal intensity changes in such a short time period.

At time t2, therefore, the flow rate of the cooling water for cooling the interface unit 50 by the second cooler 56 is controlled up to F3. This flow rate F3 is 0.1 l/min, for example.

The signal intensity detected then rises to the initial value S1 and keeps a substantially constant level, as the time elapses. This is because the temperature of the surface of the interface unit 50 rises over the boiling point of the insulator adhering to the surface, thereby removing the insulator. At this time, the temperature of the surface of the interface unit 50 is as high as or higher than the boiling point of the insulator. For example, the insulator of the case in which trace metals in the sea water is measured is sodium chloride having a boiling point of 1,413° C. Thanks to the heating over this temperature, the insulator can be removed and the signal intensity is increased enabling stable measurement.

At this time, moreover, copper or nickel used in the interface unit has a melting point of not lower than 1,500° C. If this temperature is exceeded, the interface unit melts. Therefore it is necessary that the temperature is not lower than 1,413° C. and not higher than the melting points of the materials of the interface unit.

By thus raising the flow rate of the cooling water, the signal obtained can be stabilized at a constant level with the elapse of time of the horizontal axis, namely, over a time period, for example, four to five hours, or over ten hours, as the case may be.

As in the case of the measurement of trace metals in the sea water, when the kind of the obstructive insulator is known, a high signal intensity S1 can be stably obtained from the beginning of the measurement, as shown by the dotted line of FIG. 3(A), by setting in advance the flow rate of the cooling water in cooling the interface unit 50 by the second cooler 56 at a value according to the kind of the insulator.

During the control of the temperature of the interface unit, moreover, the condition under which the plasma is produced is not changed, so that the temperature can be controlled without changing the analysis sensitivity.

By controlling the cooling water temperature with the second cooler capable of controlling the temperature of the interface unit independently, as has been described hereinbefore, the insulator can be removed by raising the temperature of the interface unit, so that the stable measurement can be performed without any drop in the signal intensity.

In controlling the temperature of the interface unit, moreover, the condition under which the plasma is produced is not changed, and hence the temperature can be controlled without changing the filtering sensitivity.

Although the mass filter is the quadrupole mass filter in the foregoing description, it should not be limited thereto but can also be an ion-trap mass spectrometer or a double-focusing mass spectrometer.

According to the invention, as has been described hereinbefore, the temperature of the interface unit can be controlled without changing the analysis sensitivity.

What is claimed is:

1. A plasma ion source mass spectrometer comprising:

a plasma ion source for ionizing a sample with a plasma;

a mass filter for subjecting the sample ionized by said plasma ion source to mass spectrometry;

an interface unit having an orifice formed in a cone for introducing the sample ionized by said plasma ion source into said mass filter, first cooling means for cooling a plasma generator of said plasma ion source and a plasma generating power source; and second cooling means for cooling said interface unit by allowing a coolant to flow through said interface unit, said second cooling means controlling the flow rate or the temperature of said coolant in such a manner that the intensity of a signal detected with said spectrometer has a value which is substantially constant.

2. A method of plasma ion source mass spectrometry using a plasma ion source mass spectrometer which includes a plasma ion source for ionizing a sample with a plasma, a mass filter for separating the sample ionized by said plasma ion source, an interface unit having an orifice formed in a cone for introducing the sample ionized by said plasma ion source into an area of high vacuum, first cooling means for cooling said plasma ion source with a flowing gas, and second cooling means for cooling said interface unit by allowing a coolant to flow through said interface unit, comprising controlling the flow rate or the temperature of said coolant of said second cooling means in such a manner that the intensity of a signal detected with said spectrometer has a value which is substantially constant.

* * * * *